March 13, 1934.     J. W. ANDERSON     1,950,588
WINDSHIELD WIPER OR THE LIKE
Filed Feb. 2, 1929
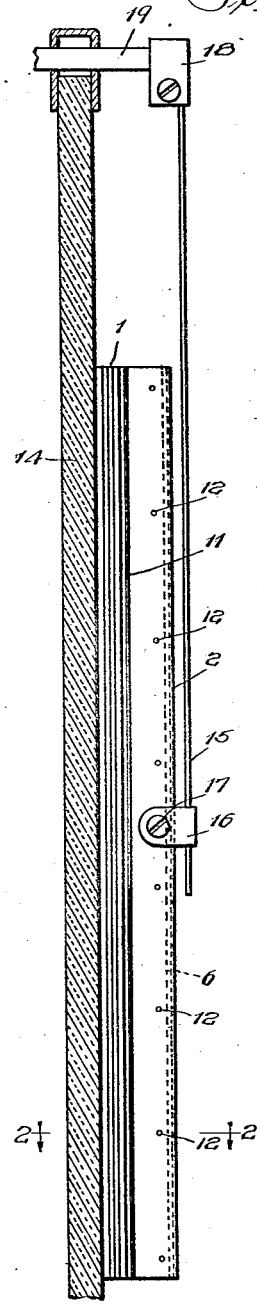
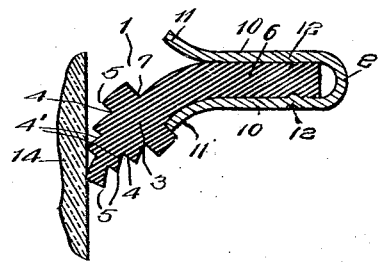
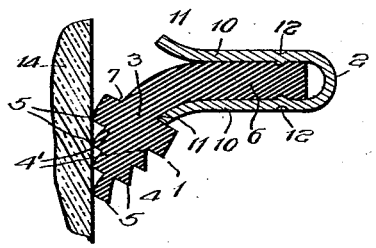
Inventor
John W. Anderson
By Hill & Hill Patented Mar. 13, 1934

1,950,588

UNITED STATES PATENT OFFICE 1,950,588

WINDSHIELD WIPER OR THE LIKE

John W. Anderson, Gary, Ind.

Application February 2, 1929, Serial No. 337,041

5 Claims. (Cl. 15—245)

My invention belongs to that general class of devices known as windshield wipers or squeegees, and relates more particularly to an improved type of wiper consisting of a rubber or like wiping element and an improved type of holder therefor. The invention has among its objects the production of a simple, durable, efficient, inexpensive and satisfactory device of the kind described for use wherever found applicable. More particularly the same has as an object the production of an improved device which has the advantages of a thin, soft, or more or less flexible or pliable wiping element, as well as the advantages of a comparatively thick or heavy body of less resiliency and yieldability. It also has as an object the production of a device that has both the advantages of the single ply and the multiple ply without their respective disadvantages, and a wiper that is particularly efficient under all weather and climatic conditions. The device is particularly efficient for removing snow, sleet and ice from the windshield or surface to be wiped. A further object is the production of a wiper and improved holder therefor, the parts being so constructed that the wiper element is at all times maintained in operative contact with the surface to be wiped, and after a limited flexing, further flexing is prevented so as to maintain an edge in contact with the surface so as to substantially scrape the surface rather than to merely draw a flat strip over the same. A further object of the invention is to provide a plurality of wiping edges in a form which will readily clean itself of mud, snow and other matter without retaining and smearing the same across the area of the windshield intended to be wiped. A further object of the invention is to provide a wiper element provided with a stepped head with relatively flexible portions between adjacent steps. Many other objects and advantages of the construction herein shown and described will be obvious to those skilled in the art from the disclosure herein shown. To this end my invention consists in the novel construction, arrangement and combination of parts herein shown and described, and more particularly pointed out in the claims.

In the drawing, wherein like reference characters indicate like or corresponding parts:

Fig. 1 is a side elevation of my improved wiper applied to a windshield glass;

Fig. 2 is a sectional view taken substantially on line 2—2 of Fig. 1;

Fig. 3 is a similar view slightly enlarged, illustrating the device in operation; and Fig. 4 is a similar view also illustrating the same in operation.

Referring to the drawing in which the preferred embodiment of the invention is shown, 1 represents generally the flexible wiping element which is mounted in a holder 2, the element 1 being preferably of rubber or equivalent material and the holder 2 of metal. As shown, the wiper element consists of a head provided with a flange or shank 6, the same resembling the letter T. The head 3 is substantially wedge-shaped or of triangular cross-sectional shape and is provided with arrises extending lengthwise from end to end. The arrises 5 are formed by reducing the width of the head in a series of steps as indicated at 4, it being understood, however, that the cross-sectional shape at the steps may be made in any equivalent manner. As shown, the head is preferably slightly undercut at the steps as indicated at 4', thereby to some extent increasing the flexibility of the head between adjacent steps. As will be noted, the shank or flange 6 is of considerably less width than the head 3 so that the same may be more easily flexed than the body of the head. Also, by reducing the width of the same, shoulders 7 are formed at either side at the juncture of the head and flange.

The holder 2 is substantially channel-shaped, that is, it is formed in the shape of a U with the spaced side portions 10—10, and in the preferred construction the side portions are bent or curved outwardly at the outer edges 11 so that the open side of the holder is flared. The outer edge of the flange 6 is mounted in the holder as shown, and it may be mentioned that the spacing of or distance between the sides 10—10 is substantially equal and preferably slightly less than the thickness or width of the flange 6 so that the flange is clamped and secured in the holder, the spring of the metal being ordinarily sufficient to securely lock the same against accidental displacement. However, if desired, the holder may be indented at intervals as indicated at 12, thereby more securely engaging the rubber flange. As will be noted by referring to Figs. 3 and 4, the flange 6 is positioned in the holder 2 in such relation to the holder that when the wiper element is flexed to one side or the other the flexed portion of the flange will bear against the curved portion of the holder with the shoulder 7 adjacent the edge 11. The ungripped portion of the flange 6 constitutes substantially a flexible hinge, permitting the head to be moved from one side to the other, while the holder prevents its collapsing. Where the same is so positioned in the holder that the shoulder 7 engages with the edge 11 in the extreme flexed position, the flexing is limited and the wiper hinge element or flange is prevented from being completely bent over at a sharp angle, thereby becoming more or less inefficient. The wiping element may be additionally secured in its holder by slightly indenting the holder into the rubber flange, as indicated at 12. With the head shown herein, this indenting does not distort the wiping edge as it would with the usual type of wiper element.

I have shown the device mounted as a part of a windshield wiper, it being understood that its use is not so limited, and in this instance 14 represents a windshield glass, the outer surface of which is to be wiped or squeegeed. The wiper is mounted on a more or less flexible rod or stem 15, being secured thereto by the clip 16 and screw 17 or equivalent means for the purpose. The particular wiper shown is of the oscillating type, the arm or rod 15 being secured by a clip 18 to a rock shaft 19 either manually operated or driven by suitable power. The particular manner of mounting the same or the source of power for operating the wiper forms no part of the present invention.

When the device is moved back and forth over a windshield glass, for instance in the direction indicated by the arrow in Fig. 3, the arrises 5 rub or wipe the water or moisture from the surface of the glass. The particular engagement of the head with the surface of the glass will depend to some extent on the mounting and the degree of pressure desired to be applied to the holder to secure the desired wiping pressure. Any irregularity in the glass or any irregularity in the movement of the device over the glass will not affect the operation of the device. The flexible hinge portion permits the device to be moved over from one side to the other in the holder when the direction of travel is reversed, but the head 3 being of substantial body is not easily distorted, the same being straight, without undulations, from end to end. However, in the embodiment shown, a certain amount of transverse flexing in the head is permitted so that a plurality of arrises may come into engagement with the surface to be wiped. Owing to the engagement of the flange with the flared side portions 10, the bending over of the flange or hinge portion is limited and a sharp bend entirely obviated.

The present device constructed as shown is fully flexible so as to allow the flexing back and forth when its direction of travel is reversed, as well as to allow the same to be always maintained in close contact with the glass. The wiping element is at the same time more or less rigid during its travel in the holder so as to afford a firm wiping or scraping action of the glass. The wiper element is so supported that it does not at any time lie flat with the glass as do the usual types of wiper elements after the wiper has been in use for a limited time, or after its non-use for a time. With the usual single ply of thin rubber, the wiper elements do not retain their shape, but in this instance the head is of sufficient body that a straight edge or a plurality of straight edges or arrises are at all times maintained from end to end and the usual undulating edge or edges avoided. A double ply wiping element or one made up of a plurality of plies is not desirable as the water and moisture or snow gets in between the plies and freezes so that the same is irregular in shape, the various plies becoming more or less undulated from the end. Likewise with a multiple ply device, dirt and moisture tends to penetrate between the plies, causing them to deteriorate. In my improved construction, while there are a plurality of wiping edges, they are in a form whereby the device will readily clean itself of mud, snow and other matter without retaining and smearing the same across the area of the windshield over which the wiper is traveling. The present device herein described is particularly efficient when wiping a surface upon which snow may accumulate or ice or sleet tends to set on the glass. When the device is not in use, the same tends to take or hold the position substantially as shown in Figs. 3 and 4, in which case the more or less substantial head bears against the shoulder 11, preventing deforming of the wiping element and hinge portion and tending to cause it to take a set which will prevent its coming back to its normal shape.

Having thus described my invention it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

1. In a device of the kind described and in combination, a wiper element and holder therefor, said wiper element consisting of an enlarged head portion provided with a flexible body arranged on the head and operating to connect the head to its holder, said holder consisting of a channel-shaped element having its sides adjacent the closed end spaced a distance substantially equal to the thickness of the body of the wiper element, the outer free edges of the sides of the channel being outwardly flared, the wiper element being so disposed in its holder that a portion of the body constitutes a flexible hinge portion connecting the head and holder which may overlie and contact with the flared over edge of the adjacent channel side when the wiper element is flexed toward that side.

2. In a device of the kind described and in combination, a single ply wiper element and holder therefor, said wiper element consisting of a head portion of triangular cross-section provided with a flexible body of less thickness than the width of the head portion extending from the base of the head and operative to connect the head to its holder, said holder consisting of a channel-shaped element having its sides adjacent the closed end spaced a distance substantially equal to the thickness of the body of the wiper element, the outer free edges of the sides of the channel being outwardly flared, the wiper element being so disposed in its holder that the shoulders on the underside of the head lie adjacent the free edge of the adjacent channel side when the wiper element is flexed toward and into engagement with that side.

3. A wiper blade comprising a head which is substantially triangular in cross section, the opposite sides of said head having longitudinally extending arrises, and an integral flexible body extending from the base of the head in a plane substantially perpendicular to said base.

4. A wiper blade comprising a head which is substantially triangular in cross section, the opposite sides of said head having longitudinally extending arrises, an integral body extending from the base of the head and being positioned within the marginal edges of said base, said body being arranged in a plane substantially perpendicular to said base and being flexibly connected to said head.

5. A windshield wiper blade comprising a head which is substantially triangular in cross-section; the opposite sides of said head having longitudinally extending arrises, and a body of relatively narrow cross-section connected to said head and extending from the base thereof between the lateral extremities of the head, said body being capable of yielding to permit the lateral movement of said head with relation to said body as the head is moved in opposite directions across the surface of a windshield.

JOHN W. ANDERSON.